United States Patent [19]

Jennen

[11] Patent Number: 5,575,716

[45] Date of Patent: Nov. 19, 1996

[54] SELF-PROPELLING AGRICULTURAL MACHINE, IN PARTICULAR HARVESTER THRESHER

[75] Inventor: Wolfgang Jennen, Guetersloh, Germany

[73] Assignee: Claas Ohg Beschränkt Haftende Offene Handelsgesellschaft, Harsewinkel, Germany

[21] Appl. No.: 423,037

[22] Filed: Apr. 17, 1995

[30] Foreign Application Priority Data

Apr. 30, 1994 [DE] Germany ............ 44 15 247.7

[51] Int. Cl.$^6$ ............ A01F 12/00; B62D 55/00
[52] U.S. Cl. ............ 460/116; 460/119; 180/9.44
[58] Field of Search ............ 460/112, 116, 460/119; 180/9.3, 9.44, 9.46, 900

[56] References Cited

U.S. PATENT DOCUMENTS 4,041,623 8/1977 Miller et al. ............ 180/9.44 X
4,174,757 11/1979 Stedman ............ 180/9.46 X
4,646,757 3/1987 Schmitt et al. ............ 460/112
4,729,445 8/1988 Kolleth ............ 180/9.46
5,191,952 3/1993 Satzler et al. ............ 180/9.46 X

FOREIGN PATENT DOCUMENTS 309030 11/1918 Germany.
461466 6/1928 Germany.
593303 2/1934 Germany.
3511647 10/1986 Germany.

*Primary Examiner*—Terry Lee Melius
*Attorney, Agent, or Firm*—Michael J. Striker

[57] ABSTRACT

A self-propelling agricultural machine has a chassis, and a traveling mechanism composed of two forward semi-caterpillars and one rearward rear steerable semi-caterpillar.

17 Claims, 2 Drawing Sheets

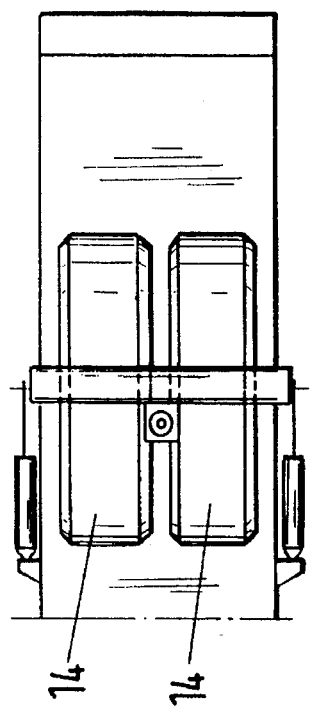
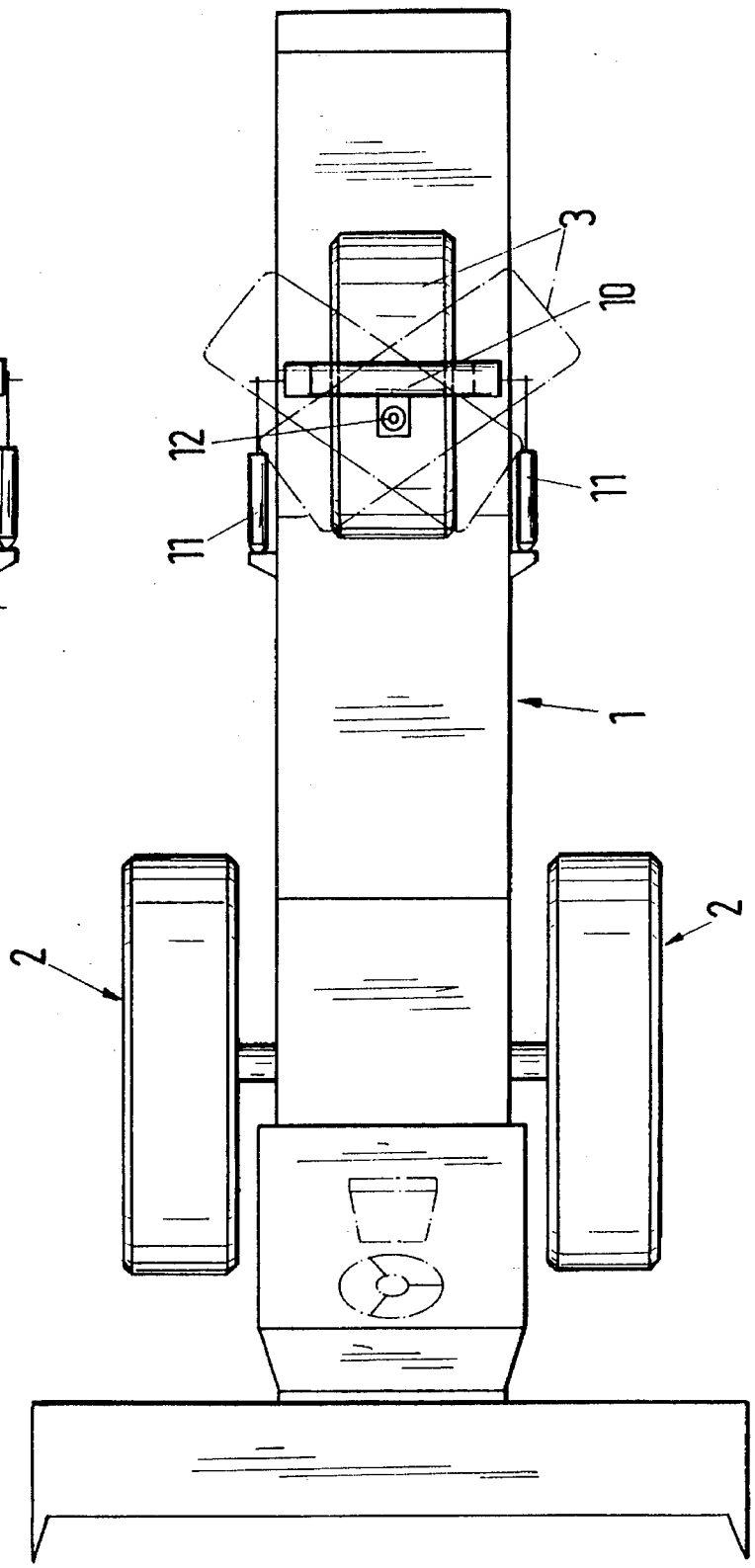

SELF-PROPELLING AGRICULTURAL MACHINE, IN PARTICULAR HARVESTER THRESHER

BACKGROUND OF THE INVENTION

The present invention relates to self-propelling agricultural machines, and particularly to harvester threshers.

In self-propelling agricultural machines, traveling mechanisms are usually provided with four wheels, with at least two front wheels which are driven and two rear wheels which are steerable. The growing machine sizes and the associated increasing mass of the agricultural machines however negatively influence the ground compression and traction of the machines. For this reason, the modern self-propelling agricultural machines are provided with all wheel drives to assure sufficient traction. In order to encounter the increasing ground compression, increasingly wide tires are utilized, such as for example so-called "Terra" tires or twin tires.

It is however difficult to provide an optimal balance of harvester thresher with a tire traveling mechanism since on the one hand due to the suspended cutting mechanism, the threshing mechanism and the driver's cabin the center of gravity of the machine is located substantially forwardly. In addition due to the filling of the upwardly located grain tank the center of gravity of the machine is displaced upwardly depending on the filling inside the grain tank can be additionally displaced in the longitudinal or transverse direction. When the harvester thresher operates on slopes, one side of the traveling mechanism must transfer a greater part of the driving and steering forces. During the operation of the harvester thresher, as well as other self-propelling agricultural machines on the slopes, the problem of the balance, traction and ground compression becomes even more substantial.

In particular moist ground conditions, for example during rice harvesting or marshy grounds, the harvester threshers nowadays use short, so-called semi-caterpillars instead of front wheels. Frequently also the complete wheel traveling mechanism is replaced with a full caterpillar system. While the full caterpillars cannot be used because of their high costs, the semi-caterpillar traveling mechanism with semi-caterpillars cannot be further expanded on the forward axle due to the disadvantages which have not been resolved. Traveling comfort and speed are increased with the utilization of rubber running bands instead of the previously utilized steel chains. In particular the steering through the rear axle provided with tires poses problems in difficult bottom conditions. For example the rear wheels can compress the bottom in undesirable manner or due to the insufficient fraction is not in position to transfer the steering force to the ground. For remaining self-propelling agricultural machines, the outer wheel or full caterpillar traveling mechanisms have now concepts for the traveling mechanism which improve the traction or reduce the ground compression.

It is known to use for tractors or military vehicles a traveling mechanism with a half caterpillar forwardly and two half caterpillars rearwardly as disclosed for example in the German patent documents DE 461466, DE 593303, DE 3511647 and the U.S. Pat. No. 4,729,445. This traveling mechanism concept is however not suitable for harvester threshers and other self-propelling agricultural machines, since the conventional weight distribution does not allow the utilization of only one forward caterpillar. The German document DE 309030 discloses a traveling mechanism concept with four semi-caterpillars, in which the rear side caterpillars are steered. This approach is however expensive to manufacture because of the use of four semi-caterpillars. The prior art discloses no suggestion where and how to arrange the hinged semi-caterpillars behind in the self-propelling agricultural machine.

SUMMARY OF THE INVENTION

Accordingly, it is an object of the present invention to provide a self-propelling agricultural machine, in particular a harvester thresher, which avoids the disadvantages of the prior art.

More particularly, it is an object of the present invention to provide a harvester thresher with a traveling mechanism which reduces the traction and ground compression problems of known traveling mechanisms without additional high costs.

In keeping with these objects and with others which will become apparent hereinafter, one feature of the present invention resides, briefly stated, in a traveling mechanism which has two front half caterpillars and one articulated rear half caterpillar.

The arrangement of the two half caterpillars forwardly is required for insuring a sufficient side stability in a machine center of gravity located in the front machine half. Because of the standing surface which is increased in the longitudinal direction of the machine, the sensitivity to the center of gravity displacement in the machine which is caused for example by filling of the grain tank is reduced. A further advantage of a longer standing surface is that the self-propelling agricultural machine reacts less sensitively to ground unevenness, less turns around the transverse axis, and less loaded during control operations in correspondence with automatic height regulation for the auxiliary devices. When no height regulation is provided, the driver can relax since it must pay less attention to the optimal height guidance of the auxiliary device. Since the semi-caterpillars are flatter than the conventional tires, it is also possible to lower the machine center of gravity and thereby to increase the tilting stability of the machine. Due to the above described improvement of the standing safety of the machines with the use of the semi-caterpillars, it is possible to replace both articulated tires on the rear axle by one articulated semi-caterpillar without jeopardizing the standing stability of the machine.

The standing surface of the semi-caterpillar which is increased many times when compared with the tires results in a substantially reduced ground compression, as the semi-caterpillars mounted on the front axle. Simultaneously, the rear articulated semi-caterpillar due to the greater standing surface, transmits higher steering forces and, when the rear semi-caterpillar is also driven, transmits higher pulling forces. The above described concept of the traveling mechanism provides also the advantages of the lower costs when compared with known caterpillar mechanism systems since only three semi-caterpillar modules are required for the concept.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 2 is a view from above of the inventive harvester thresher; and

FIG. 3 is a view showing a rear articulated semi-caterpillar module with a twin caterpillar.

DESCRIPTION OF THE PREFERRED EMBODIMENTS

Figure 1:
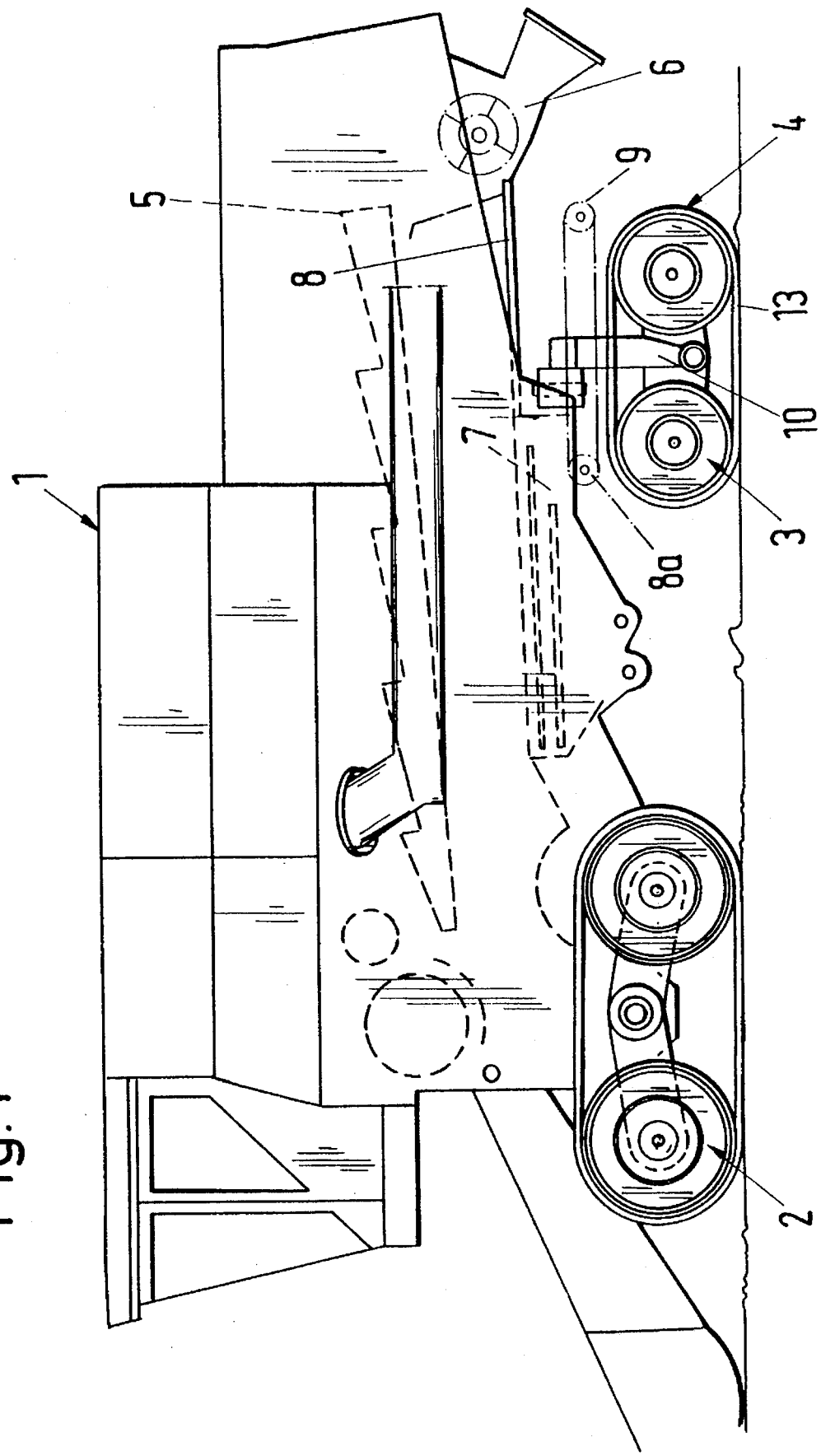
FIG. 1 is a side view of a harvester thresher with the inventive traveling mechanism in accordance with the present invention.

A harvester thresher in accordance with the present invention is identified with reference numeral 1. The harvester thresher 1 instead of a front tire, has a semi-caterpillar 2. The semi-caterpillar 2 is composed of two guide wheels and an endless band running over them.

The harvester thresher 1, instead of a rear axle, is supported at the rear end on a centrally arranged and similarly formed semi-caterpillar 3. The harvester thresher 1 also has a separating device 5 and a distributing device 6.

The rear end of the semi-caterpillar 3 is located forwardly of the end of the separating device 5 and the distributing device 6. The harvester thresher further has a sieve device 7 with a discharge end located forwardly of the end of the rear semi-caterpillar. A stepped plate 8 or a transporting band 8a can be alternatively arranged in the caterpillar. Its rear end 9 extends outwardly beyond the end of the caterpillar 4. Thereby it is avoided that the chaff discharge falls on the running band or its supporting or steering device and causes undesired dirtying and disturbances.

The supporting frame 10 of the semi-caterpillar running mechanism 3 can be pivotally connected through a double-acting or two single-acting cylinder-piston units 11. The extension and retraction of the cylinder-piston units 11 causes a turning of the supporting arm about the turning axis 12. Instead of the individual running band 13, the rear semi-caterpillar running mechanism 3 can be also composed of a twin running mechanism with two endless bands 14.

In order to take into consideration the special conditions of use of harvester threshers, certain requirements must be satisfied with the arrangement of the rear semi-caterpillar 3. The use of the semi-caterpillar 3 at the rear must not influence the swab deposits of the threshed straw. Correspondingly, the rear end of the semi-caterpillar 3 must not project over the rear end of the shaker 5 when it is desired to avoid mounting of a guiding device for favorable steering of the straw flow. Also, the operation of the straw chopper must not be affected by the semi-caterpillar.

In order to avoid dirtying of the running band and their control elements by chaff, it is advantageous to arrange the end of the semi-caterpillar 3 forwardly of the end of the harvester threshing sieve 7. When there is no mounting space nor it is not possible for balance reasons, the chaff can be guided by the transporting band 8a arranged over the semi-caterpillar or a similar transporting element over the extending semi-caterpillar end. Therefore the chaff together with the threshed straw is distributed by a distributing device over the working width of the harvester thresher.

It is advantageous to form the modules of the semi-caterpillars 2, 3 so that they can replace a tire traveling mechanism with minimum mounting expenses. In the case of alternating conditions of application, maintenance and repair it is possible to perform the corresponding conversions fast with low expenses and to keep one machine without limitations as to its use. These works are especially simple when the rear semi-caterpillar 3 in a given machine is mounted on the same suspension points as a conventional axle with articulated tires.

A stable suspension point is provided in the harvester thresher by a lower transverse element at the rear end of the machine frame. For obtaining a minimum low structural height of the rear semi-caterpillar unit 2, 3 including the suspension and the steering means, it is advantageous to arrange the lower transverse member at the rear end of the machine frame horizontally on the same height with the turning hinge so as to turn the semi-caterpillar module 3 for steering purposes, and to arrange the upper transverse member of the supporting frame 10 for the semi-caterpillar module 3. A suspension device for example for cutting mechanism can be mounted at the rear side of the transverse member of the supporting frame 10 for the semi-caterpillar module as considered in the traveling direction. With the above proposed mounting of the semi-caterpillar module with low structural height, it is possible to provide plates for straw and chaff distributing and depositing devices located under the separating device 5 and the cleaning device 7. For this purpose the vertically extending lateral support of the holding arm for the semi-caterpillar is formed so as to swing forwardly in the traveling direction. Thereby, with a predetermined length of a semi-caterpillar, the suspending points of the semi-caterpillar 3 are placed further forwardly on the supporting frame 10 as considered in a traveling direction and due to the forward displacement of the semi-caterpillar a greater free space is produced to be used by the distributing and depositing devices.

For obtaining an optimal ground pressure distribution with the rear semi-caterpillar as well as acceptable traveling comfort, the rear semi-caterpillar 3 must be supported rotatably about a transverse axis. Since the rear semi-caterpillar module can be deflected by swinging movements of ground unevenness, it is avoided that the ground contact in unfavorable case is limited to a small raise extending outwardly from the remaining bottom surface and the overriding of such an unevenness is sensed by the driver as a vertical strike.

With a single articulated semi-caterpillar, the steering of the semi-caterpillar is performed differently than in the known axle traveling mechanisms. It should be mentioned that the forces to be transmitted which are required for changing the impact angle of a semi-caterpillar are substantially greater than the forces which must be used for the impact of an air tire. A stable solution is to connect the supporting frame 10 of the semi-caterpillar running mechanism turnable about the vertical axis 12 directly through a double-acting or two single-acting hydraulic cylinder-piston units 11 with the harvester thresher frame and to transport the steering forces through the working stroke of the lifting cylinder-piston unit. It is also possible to provide the supporting frame with a rotary rim and to transmit the steering forces through a worm transmission or a toothed wheel acting on the toothing of the rotary rim, from the machine frame to the semi-caterpillar running mechanism.

In order to further improve the ground compression and the traction, the individual caterpillar running band 13 of the rear articulated semi-caterpillar 3 can be replaced by a twin running band.

It will be understood that each of the elements described above, or two or more together, may also find a useful application in other types of constructions differing from the types described above.

While the invention has been illustrated and described as embodied in a self-propelling agricultural machine, in particular harvester thresher, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

I claim:

1. A self-propelling agricultural machine, comprising a chassis; a traveling mechanism, said traveling mechanism being composed of two forward semi-caterpillars and one rear steerable semi-caterpillar located behind said forward semi-caterpillars as considered in a traveling direction, and said rear steerable semi-caterpillar is arranged substantially centrally as considered in a transverse direction; a separating device having a discharge end; a sieve box having a throwing end; and a transporting and guiding device for transporting chaff and having a rear end, said rear steerable semi-caterpillar end having a rear end which is located forwardly of said discharge end of said separating device, forwardly of said rear end of said sieve box, and forwardly of said rear end of said transporting and guiding device.

2. A self-propelling agricultural machine as defined in claim 1, and further comprising a straw chopper having a housing, said rear steerable semi-caterpillar has a rear end located forwardly of said housing of said straw chopper as considered in the traveling direction.

3. A self-propelling agricultural machine as defined in claim 1, wherein said chassis has suspending points which support said rear steerable semi-caterpillar and are formed so as to support a conventional axle.

4. A self-propelling agricultural machine as defined in claim 3, wherein said chassis has a supporting frame on which said transverse member is mounted; and further comprising a suspending device mounted on said transverse member.

5. A self-propelling agricultural machine as defined in claim 1, wherein said chassis has a rear lower end provided with a transverse member, said rear steerable semi-caterpillar being mounted on said transverse member.

6. A self-propelling agricultural machine as defined in claim 5, wherein said chassis has a supporting frame, said transverse member being arranged on said supporting frame; and further comprising a steering hinge having a turning axis on which said rear steerable semi-caterpillar is mounted for steering.

7. A self-propelling agricultural machine as defined in claim 6, wherein said rear steerable semi-caterpillar has a turning axis, said transverse member of said supporting frame being located behind said turning axis of said rear steerable semi-caterpillar as considered in the traveling direction.

8. A self-propelling agricultural machine as defined in claim 1, wherein said chassis has a substantially vertical lateral supporting frame for supporting said rear steerable semi-caterpillar, said supporting frame being swingable forwardly as considered in the traveling direction and carrying suspension points for said rear steerable semi-caterpillar so as to provide a forward displacement of said suspension points.

9. A self-propelling agricultural machine as defined in claim 1, wherein said chassis has a supporting frame for said rear steerable semi-caterpillar, said rear steerable caterpillar being supported in said supporting frame turnably about a transverse axis.

10. A self-propelling agricultural machine as defined in claim 1, wherein said chassis has a supporting frame for supporting said rear steerable semi-caterpillar; and further comprising a cylinder-piston unit arranged to transfer steering forces from said chassis to said supporting frame by a working stroke of said cylinder-piston unit.

11. A self-propelling agricultural machine as defined in claim 10, wherein said cylinder-piston unit includes a double-acting cylinder-piston unit.

12. A self-propelling agricultural machine as defined in claim 10, wherein said cylinder-piston unit includes two single-acting cylinder-piston units.

13. A self-propelling agricultural machine as defined in claim 1, wherein said chassis has a supporting frame for supporting said rear steerable semi-caterpillar, said supporting frame having a toothed rim; and further comprising a toothed wheel transferring steering forces from said chassis to said toothed rim of said supporting frame.

14. A self-propelling agricultural machine as defined in claim 1, wherein said chassis has a supporting frame for supporting said rear steerable semi-caterpillar, said supporting frame having a toothed rim; and further comprising a worm transmission transferring steering forces from said chassis to said toothed rim of said supporting frame.

15. A self-propelling agricultural machine as defined in claim 1, wherein said rear steerable semi-caterpillar has an endless band and a drive for said endless band.

16. A self-propelling agricultural machine, comprising a chassis; a traveling mechanism said traveling mechanism being composed of two forward semi-caterpillars and one rear steerable semi-caterpillar located behind said foward semi-caterpillars as considered in a traveling direction, and said rear steerable semi-caterpillar is arranged substantially centrally as considered in a transverse direction, said articulated semi-caterpillar having a rear end; and a sieve box having a discharge end and transporting and guiding means arranged so that chaff is transported from said discharge end of said sieve box by said transporting and guiding means behind an end of said rear steerable semi-caterpillar and laid on a ground, said transporting and guiding means extending behind said rear end of said rear steerable semi-caterpillar as considered in the traveling direction.

17. A self-propelling agricultural machine, comprising a chassis; a traveling mechanism, said traveling mechanism being composed of two forward semi-caterpillars and one rear steerable semi-caterpillar located behind said forward semi-caterpillars as considered in a traveling direction, and said rear steerable semi-Caterpillar is arranged substantially centrally as considered in a transverse direction; a sieve box with a discharge end; a movable transporting device; and a distributing device arranged so that chaff is transported from said discharge end of said sieve box by said movable transporting device to said distributing device, said distributing device being arranged behind a rear end of said rear steerable semi-caterpillar as considered in the traveling direction.

* * * * *